Patented Apr. 22, 1941

2,239,519

UNITED STATES PATENT OFFICE 2,239,519

REDUCING SOLUTION FOR SILVERING OPERATIONS

Alexander G. Gurwood, Pittsburgh, Pa., assignor to Pittsburgh Plate Glass Company, Allegheny County, Pa., a corporation of Pennsylvania No Drawing. Application March 15, 1938, Serial No. 196,008

9 Claims. (Cl. 252—188)

The present invention relates to reducing solutions employed in the deposition of metals from their salts and more particularly to solutions which are adapted for use in the silvering of mirrors.

One object of the present invention is the provision of a reducing solution which has a relatively slow rate of reaction with silver oxide, and which, therefore, will result in the deposition of an exceptionally uniform and continuous silver film in the plating of mirrors.

Other objects and advantages of my invention will become more apparent from the following detailed description of certain embodiments thereof.

The deposition of silver films upon glass plates is usually accomplished by the reduction of an ammoniacal solution of silver oxide with a sugar solution. This reaction is designed particularly for the so-called "cold silvering" process which is effected at temperatures of from 65 to 80 degrees F. The composition of the sugar solution includes a reducing sugar, such as dextrose or invert sugar, in an aqueous solution to which has been added a relatively small amount of an aliphatic alcohol as a mold deterrent. Generally a small percentage of nitric acid is included in the formulation of the solution. A reducing solution of this composition, however, reacts very rapidly with the silvering solution and the reduced silver oxide is deposited upon the glass plates as an imperfect film. Such rapid deposition also prevents a good adhesion of the silver film to the glass and the resultant mirror is subject to early deterioration.

Various attempts have been made to control the rate of reaction but they have not proven satisfactory. For example, the concentration of the ammoniacal silver solution has been reduced but the dilute solutions require a longer time for the deposition of an extremely thin film of silver. In other cases, the silvering has been performed at lower temperatures, an expedient which would reduce the rate of deposition to be sure, but which at the same time resulted in the formation of porous, imperfect silver films.

It has been found that the addition of a relatively small percentage of a water soluble, organic acid to the reducing sugar solution decreases the speed of the deposition of silver at higher operating temperatures. Formic, acetic, propionic, citric, and tartaric acids may be used as the additive producing the desired effects. Exceptionally fine results have been obtained through the use of tartaric and citric acids, although any of the indicated acids and others falling within the scope of the designated class may be substituted therefor.

It is believed that the organic acid acts in the nature of an inhibitor or negative catalyst of the reducing action by changing the hydrogen ion concentration of the sugar solution, retarding the decomposition of the ammoniacal solution of silver oxide and the subsequent deposition of metallic silver. This control over the reducing solution permits a regulation of the rate of silvering while the other conditions under which the plating operation is performed are maintained for optimum efficiency.

The reducing sugar solution is readily prepared by the addition of the water soluble, organic acid, dextrose and aliphatic acid to distilled water. The formulation may be illustrated as:

| | Per cent by weight |
|---|---|
| Dextrose | 1 to 5 |
| Denatured ethyl alcohol | 3 to 8 |
| Water soluble organic acid | 0.5 to 10 |
| Distilled water | 77 to 96 |

Other reducing sugars, including invert sugar, could be substituted for dextrose, and methyl or propyl alcohol could replace the ethyl alcohol or be used in combination therewith.

As a more specific example of a reducing solution as contemplated by my invention, the following composition is given:

| | Per cent by weight |
|---|---|
| Dextrose | 2 |
| Denatured ethyl alcohol | 4 |
| Tartaric acid | 1 |
| Distilled water | 93 |

The solution is prepared according to standard practice, that is, the reducing sugar is dissolved in a small amount of water and subsequently the other components and the remainder of the water are added thereto. The solution as prepared will stand for an indefinite period of time without impairment of its chemical properties.

When a glass plate is to be silvered, it is cleaned thoroughly and placed on a level table, which may be heated to about 80 degrees F. The silvering solution is prepared by mixing an ammoniacal solution of silver oxide with an equivalent amount of the reducing solution and is then poured over the glass plate. After the silver film has been deposited on the glass, any excess of reagents is removed, the glass is washed and dried and the silver film is then coated with a protective coating.

The acid inhibited reducing solution as contemplated by my invention enables the production of superior silver films due to the retarded rate of deposition and the greater control possible over the reaction. The silver films are strongly adhered to the glass and will, therefore, resist deterioration.

It will be obvious that various modifications may be made in the particular compositions disclosed and the manner in which they are used without departing from the spirit of my invention or the scope of the appended claims.

What I claim is:

1. A reducing sugar solution for use in the silvering of mirrors comprising a water soluble organic acid selected from the group consisting of acetic, citric and tartaric acids, an aliphatic alcohol and a reducing sugar.

2. A reducing sugar solution for use in the silvering of mirrors comprising from 0.5 to 10 per cent by weight of a water soluble, organic acid selected from the group consisting of acetic, citric and tartaric acids, approximately 5 per cent by weight of an aliphatic alcohol, from 1 to 5 per cent by weight of a reducing sugar, and distilled water.

3. A reducing sugar solution for use in the silvering of mirrors comprising from 0.5 to 10 per cent of tartaric acid, approximately 5 per cent of ethyl alcohol, from 1 to 5 per cent by weight of dextrose, and distilled water.

4. A reducing sugar solution for use in the silvering of mirrors comprising from 0.5 to 10 per cent of citric acid, approximately 5 per cent of ethyl alcohol, from 1 to 5 per cent by weight of invert sugar, and distilled water.

5. A reducing sugar solution for use in the silvering of mirrors having the approximate composition:

| | Per cent |
|---|---|
| Dextrose | 2 |
| Denatured ethyl alcohol | 4 |
| Tartaric acid | 1 |
| Distilled water | 93 |

6. A reducing sugar solution for use in the silvering of mirrors having the approximate composition:

| | Per cent |
|---|---|
| Invert sugar | 2 |
| Denatured ethyl alcohol | 4 |
| Tartaric acid | 1 |
| Distilled water | 93 |

7. A reducing sugar solution for use in the silvering of mirrors having the approximate composition:

| | Per cent |
|---|---|
| Dextrose | 2 |
| Denatured ethyl alcohol | 4 |
| Acetic acid | 1 |
| Distilled water | 93 |

8. A process of preparing metallic silver from a solution of ammoniacal silver oxide which comprises adding thereto an aqueous solution of a reducing sugar containing from 0.5 to 10 per cent of a water soluble organic acid.

9. A process of preparing metallic silver from a solution of ammoniacal silver oxide comprising adding thereto an aqueous solution including in approximate amounts 5 per cent of dextrose, 5 per cent of ethyl alcohol and 1 per cent of tartaric acid, the tartaric acid content of the reducing sugar solution serving to retard the rate at which the ammoniacal silver oxide is converted into metallic silver.

ALEXANDER G. GURWOOD.